Figure 1:
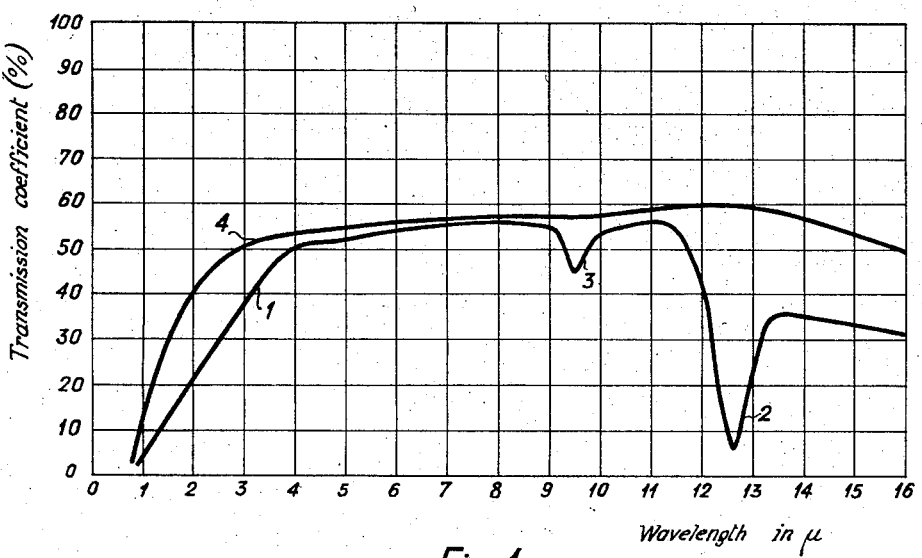

May 19, 1959  F. F. GANS  2,887,359
METHOD FOR PREPARING PENTAVALENT ARSENIC SELENIDES
Filed Nov. 8, 1954

INVENTOR
FRANCOIS A GANS

BY A. A. Saffitz
ATTORNEY

2,887,359
METHOD FOR PREPARING PENTAVALENT ARSENIC SELENIDES

François F. Gans, Paris, France

Application November 8, 1954, Serial No. 467,585

Claims priority, application France November 12, 1953

5 Claims. (Cl. 23—50)

This invention relates to novel optical elements, such as optical filters, windows, prisms and lenses, which are opaque in the visible light range and which are transparent in the infra-red light range at wave lengths extending from about 0.5 micron to about 20 microns.

It has been found that infra-red transparent optical elements of improved optical characteristics are obtained from pentavalent arsenic selenides, such as arsenic pentaselenide $As_2Se_5$, arsenic di-sulfido triselenide $As_2S_2Se_3$, and arsenic tri-sulfido di-selenide $As_2S_3Se_2$. These vitreous pentavalent arsenic selenides alone or in admixture with pentavalent arsenic sulfides may be purified by dissolving in an aqueous alkaline solvent, reprecipitating with acid and remelting to improve the infra-red transparency characteristics of the optical elements obtained through conventional optical forming procedures.

The infra-red region of the spectrum may be broken down into four distinct regions:

(1) The near infra-red, between about 0.75 micron and 3 microns.

(2) The middle or median infra-red, about 3 to about 15 microns.

(3) The remote infra-red from about 15 to about 50 microns.

(4) The extreme infra-red, extending beyond 50 microns to define a region which at the present time is of acedemic scientific interest.

With respect to the above ranges, the following materials, either as natural mono crystals (single crystals) or artificially made single crystals have been hitherto used for infra-red optical elements:

| Name | Formula | Range |
|---|---|---|
| Calcium Fluoride | $CaF_2$ | up to 10 microns. |
| Sodium Chloride | NaCl | up to 15 microns. |
| Potassium Bromide | KBr | up to 22 microns. |
| Silver Chloride | AgCl | up to 30 microns. |
| Caesium Iodide or | CsI | up to 50 microns. |
| Caesium Bromide | CsBr | up to 50 microns. |
| Thallium Bromo-Iodide | $\begin{Bmatrix} TlBrI_2 \\ (KS_5) \\ TeBr_2I \end{Bmatrix}$ | up to 45 microns. |

The above materials exhibit characteristic defects and disadvantages, inherent in the nature of these materials, which have seriously limited their usefulness for optical purposes. The production of crystals is very sensitive to contaminations which are not isomorphous with the crystal lattice. Elaborate furnaces are necessary in growing crystals of considerable size. The dimensions of the crystals are limited by the dimensions of the crucible used and by the difficulties in precisely controlling the necessary growing conditions characteristic of the particular crystal and its properties in the single crystal formed. The growing conditions must be delicately balanced and the problems in technique are formidable. The preparation of large sized monocrystals is complex, expensive and time consuming.

The usefulness of the crystalline products is necessarily limited by certain physical and chemical weaknesses inherent with these materials. For example, sodium chloride, potassium bromide, caesium iodide and caesium bromide are hygroscopic and they cleave or fracture quite easily. These crystals are so fragile and resist mechanical shock so poorly that their use has become severely limited. The bromo-iodides of caesium are so hygroscopic that for many purposes they are quite unsuitable in infra-red optical systems for ordinary purposes. Calcium flouride is sensitive to fracture, is readily cleaved and is quite fragile. Although silver chloride has better resistance towards cleavage or fracture than calcium fluoride, and although it does not have the disadvantage of being hygroscopic, this material is photo-chemically reduced to silver by the action of visible and actinic light. Accordingly, the use of this material as an optical element in the infra-red region requires that means be provided to protect the silver chloride against breakdown by the action of visible or actinic light. It is thus seen that the instability towards light of silver chloride requires that extensive structural and optical modifications be made to prevent the infra-red transparent element from deteriorating during use. Thallium bromo-iodide is quie difficult and costly to prepare but its principle disadvantage is that it is very soft and therefore very difficult to polish in order to provide the optical surfaces required for the use to which it is put.

Heretofore, the limitations in the use of crystalline materials due to these defects and disadvantages have been well recognized and it has been proposed to use sulfide glasses which, generally speaking, cover the range from about 0.7 micron to about 11 microns in thicknesses useful to the practical optical worker (see Frerichs; Physical Review 1950, page 643; Journal of the Optical Society of America, 43, December 1953, pp. 1153–1157; and Fraser, Journal of the Optical Society of America, September 1953, p. 823).

The use of glasses of vitreous materials has the advantage that the discs or blanks may be cast and annealed following well-known and highly developed glass making techniques. Likewise, the forming of the blanks into the finished optical elements, using a glass which has suitable physical characteristics, follows well-known optical procedures. The control of the composition is much easier in the casting of a glass than in the growing of a large mono crystal. A greater variation in transmission, refractive index and dispersion can be achieved through composition control in the glass than in the case of artificially grown crystals.

Arsenic tri-sulfide and selenium have been proposed by Frerichs, above cited, selenium being transparent to about 15 microns, arsenic trisulfide being useful between about 0.7 micron and about 11 microns. Arsenic triselenide has been proposed by Fraser. These substances have numerous characteristic absorption bands which reduces their transmission and thereby limits their usefulness in the infra-red range under consideration.

An object of the present invention is to provide useful optical elements transparent in the infra-red region beyond 5 microns, which elements are substantially opaque in the visible spectrum and which are transparent in the infra-red median region up to about 15–20 microns, which elements are free from inherent absorption bands throughout said median range of said spectrum and which elements are physically and chemically inert to permit their use under ambient atmospheric and laboratory conditions. The materials of the invention used as infra-red transparent filters, windows and elements are insoluble in water and in common solvents and are resistant to fracture or cleavage, yet they are sufficiently hard to be readily cut and polished by ordinary optical fabricating procedures. The infra-red transparent elements of the invention are unaffected by visible light, being substantially opaque thereto, and are easily prepared in the vitreous condition so that they may be readily fabricated by ordinarily optical cutting and polishing techniques.

Other and further objects will appear from the more detailed description which follows, taken in connection with the accompanying drawings, it being understood that modifications and variations may be made by one skilled in the art without essentially departing from the scope and the spirit of the invention, as set forth in the claims.

Figure 2:
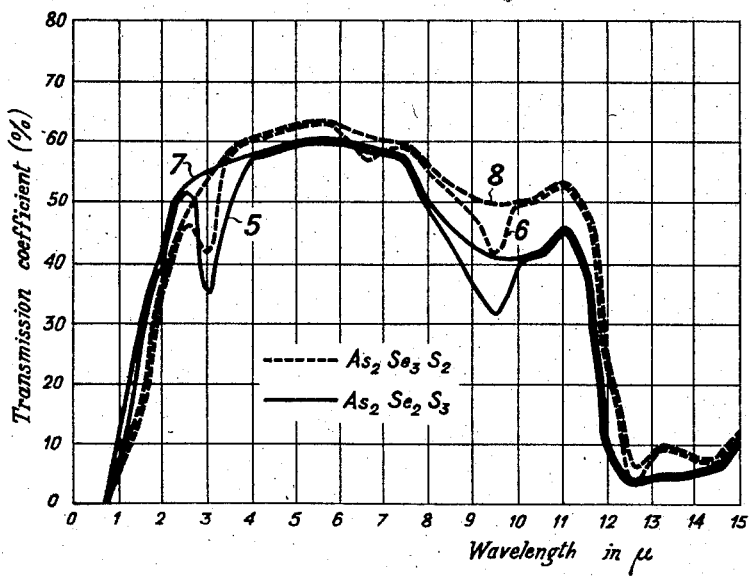

In the drawings:

Figs. 1 and 2 are a graphical representation of the infra-red transmission characteristics at increasing wave lengths in the median infra-red range, of certain optical filter elements prepared according to the invention.

In the preparation of the new infra-red transparent arsenic pentaselenide glasses according to the invention, the initial pentavalent arsenic compounds are prepared by fusion of the elements, arsenic and selenium, in stoichiometric proportions. The fusion may be carried out to make compounds with selenium alone or with selenium and sulphur in the proper stoichiometric proportions, E. Szavasy and H. Uelsmann in Pascal "Traité de Chimie Minérale," vol. III, page 646, have noted that compounds of selenium and arsenic present a black, vitreous appearance.

The penta-selenide of arsenic prepared by fusing the elements under an inert gas, such as nitrogen or argon was expected to exhibit absorption bands in the median infra-red range as in the known case of the tri-sulfide and the tri-selenide of arsenic. Such types of infra-red absorption bands were found in the fused initial product. Surprisingly, these absorption bands are substantially eliminated by purifying the product. Purification is effected through a process of comminuting to a finely divided state, the cast initial vitreous product, dissolving in an alkaline aqueous solvent, such as ammonium hydroxide, alkali metal hydroxide for example, reprecipitating with acid, such as hydrochloric acid, washing free from impurities, drying and remelting at a temperature slightly higher than that employed for the initial fusion operation wherein the material was prepared from the elements.

Because it is desired to obtain maximum purification in the purified element to substantially eliminate the absorption bands associated with the pentavalent arsenic selenide associated with the product prepared by fusion from the elements, the alkaline reagents used in dissolving the finely divided fused product are preferably of the highest quality. The temperature and concentration conditions in the purifying reactions of the fusion product, alkaline solvent and reprecipitating acid may be widely varied as long as undesirable side reactions are avoided in the formation of the alkaline arsenoseleniate and in the conversion of these last named compounds into the pentavalent arsenic selenide. The concentrations and rates of addition of the treating reagents are adjusted to handle convenient quantities of the solutions concerned, to avoid overheating and to provide the reprecipitated product in good physical form so that it is readily washed free of impurities. Preferably the reactions are carried out at room temperature, up to 30° C., and it is convenient to use an appropriate amount of alkaline solvent, such as 10–20% aqueous NaOH, or 10–15% NH$_4$OH, care being taken that not too much of an excess be used in order to prevent waste of the mineral acid.

Other alkaline hydroxides may be used, under the requirements as set forth above, in varying concentrations, and these may alter the volumes of treating liquids and washing liquids and the time of treatment but, as will be understood, it is essential that the recovered acid-precipitated selenide be washed completely free from impurities before the product is dried and again heated. Accordingly, hydrochloric acid is preferred from the standpoint of suitability and economy, but other acids may be used.

The fusion of the purified recovered precipitate is preferably carried out under similar conditions but at a temperature slightly higher than that employed in preparing the initial product. The temperature of about 450° C. for initial fusion carried out in an inert atmosphere under carefully controlled conditions to prevent undesirable side reactions may be elevated to about 500° C. under the same inert gas conditions with the purified product to obtain a product exhibiting a marked improvement in infra-red transmission (penta-selenide). Remarkably, the purified penta-selenide of arsenic does not provide the troublesome absorption bands in the middle infra-red region.

As shown by curve 1 in Fig. 1, the arsenic pentaselenide composition prepared in accordance with Example 1 below, exhibits a domain of transparency extending from about 0.5–1 micron to 15 microns and beyond, but absorption band 2 is quite significant at 12.7 microns and the weaker absorption band 3 at about 9 microns also seriously limits the usefulness of the filter in these specified spectral regions.

Although, on occasion, these absorption bands may be useful in certain instances where infra-red is to be screened in the region of band 2 and band 3, it is frequently preferred to provide uniform maximum transmission throughout the middle infra-red range.

Thus, by the purification treatment as outlined above and as set forth, by way of example below, optical elements comprising the purified arsenic penta-selenide exhibit the transmission characteristics as graphically set out in curve 4.

As shown by curve 4 in Fig. 1, the transparency in the infra-red (percent transmission) of the purified product is superior to that of the fusion product. The transmission of the purified product extends further, beyond 15 microns and out to about 20 microns, than that of the fusion product. Further at the visible boundary of the spectrum, i.e. at about 0.75 micron the transmission curve 4 of the purified product mounts steeply to a higher value where it flattens out as compared with the more gradual curve 1 of the fusion product. Thus, the purified arsenic penta-selenide is for all practical purposes, opaque to visible light (region of 0.75 micron) having a transmission amounting to a few thousandths of a percent.

Valuable further improvements are obtained in accordance with the invention by fusing pentavalent arsenic selenide glasses from the elements, wherein up to three atoms of selenium are replace by sulphur. Preferably, the fusion compositions are stoichiometrically adjusted to form the di-sulfido-selenide and tri-sulfido-selenide. In Fig. 2, curve 5 represents the transmission of a filter element having optically prepared surfaces (parallel) separated by a distance which is 1 millimeter thick, comprising As$_2$Se$_2$S$_3$, and curve 6 represents the transmission of a specimen 0.77 millimeter thick comprising Ss$_2$Se$_3$S$_2$. Characteristic absorption bands at about 3 microns and at about 9.5 microns are shown for these materials in Fig. 2.

Purification by the method above outlined and exemplified in Example 2 improves the transmission in these regions of absorption and this method may be employed but it is preferred to follow the procedure wherein the final product is obtained by the appropriate mixing purified arsenic penta-sulfide and purified arsenic penta-selenide, these purified according to the preferred procedure of dissolving in an alkaline solvent, reprecipitating with acid, washing, drying and refusing at elevated temperatures of about 500° C., as outline herein.

This appropriate mixing comprises the intimate admixture of the purified dry penta-sulphides and penta-selenides, as each is separately recovered before fusion in the mol proportions, sulfide to selenide, ⅔:⅓, for As$_2$Se$_3$S$_2$ (see curve 6, Fig. 2) or of ⅓:⅔ for As$_2$Se$_2$S$_3$ (see curve 7, Fig. 2). This modified procedure produces optical products of improved transparency, of improved opacity at the visible boundary of the infra-red (less than 3% transmission in the visible) and surprisingly, substantially eliminates the serious absorption bands associated with the products prepared by fusion.

These new infra-red transparent pentavalent arsenic selenide glasses may be cast, cut, ground and polished to provide any variety of optical elements. Alone or in optical combination, such elements provide desirable, precisely controlled variations in transmission, refractive index and dispersion throughout the median infra-red range and substantial opacity to visible light is achieved. The glassy products are stable and are inert to moisture, and ordinary laboratory chemicals. The products may be readily polished to very accurate thicknesses and the polished surfaces stand up well under ordinary use.

The invention is further illustrated by the following examples, it being understood that these examples are merely illustrative and that the invention is not limited thereto.

EXAMPLE 1

*The preparation of the fusion product*

Arsenic penta-selenide glass is prepared by fusing the pure elements in the requisite proportions of the constituent elements for the formula $As_2Se_5$ at a temperature of about 450° C. under an inert atmosphere, such as nitrogen. The required amounts of the finely ground constituent elements are intimately mixed placed in a suitable boat and then in a Pyrex tube of suitable dimensions, under the inert atmosphere (nitrogen or argon). The tube is placed in a furnace, the temperature is raised to about 450° C. and after several hours, about 3–4 hours, the tube is withdrawn and quickly inverted to cast the black molten glass formed within the Pyrex tube proper, whereafter the product is permitted to cool. In this manner, ingots are prepared which are readily removed, cut accurately as desired and polished to provide elements with optically prepared surfaces. A filter element having parallel faces, when is 1 mm. in thickness is so prepared and it exhibits the transmission curve 1 in Fig. 1.

EXAMPLE 2

*The purification of the pentavalent arsenic selenide glass*

Starting with the fusion product of Example 1, the product is finely ground and is dissolved in 20% $NH_4OH$ at room temperature (about 25° C.). Any insoluble material is removed and to the alkali arsenoseleniate solution, there is added aqueous 15% HCl solution until the hydroxide is neutralized and brought to the acid side. A precipitate of $As_2Se_5$ is formed which is filtered and washed to eliminate the chloride ion. After being washed free of impurities with chloride free distilled water, the precipitate is dried and refused as in Example 1 at a temperature a little higher than employed in Example 1, namely at about 500° C. Upon cooling, the purified fusion product is cut and polished into a filter element having parallel faces 1 millimeter thick and the transmission curve is given as curve 4 in Fig. 1.

EXAMPLE 3

Using 10% NaOH in place of the 25% $NH_4OH$ of Example 2 equally good transparency and purification results are obtained.

EXAMPLE 4

By the fusion method of Example 1, the requisite proportions of the elements are intimately admixed in finely divided form to make the sulfido-selenides $As_2Se_2S_3$ and $As_2Se_3S_2$. The transmission curves are shown for a filter element 1 millimeter thick for $As_2Se_2S_3$ and 0.77 millimeter thick for $As_2Se_3S_2$ vs. 5 and 6 respectively in Fig. 2.

Purification is carried out of the fused products of this example as in Example 2 and the absorption bands are substantially eliminated.

EXAMPLE 5

The yield of the purified products of Example 4 is further improved by mixing the fusion sulfide $As_2S_5$ and the fusion selenide $As_2Se_5$ prepared as in Example 1, in the requisite proportions to provide the di- and tri-sulfido-selenides, $As_2Se_3S_2$ and $As_2Se_2S_3$, respectively; i.e. ⅖ to ⅗ mol, sulfide to selenide, for the former, and ⅗ to ⅖ mol sulfide to selenide for the latter. However before fusion, the sulfides and selenides are purified by the process of Example 2, as that after they are chloride free, the powders are dried and fused at the elevated temperature of 500° C. as in Example 3. The transmission curves are given as curves 7 and 8 respectively in Fig. 2.

The major fraction of infra-red radiation transmitted by the new elements of the invention is seen to be above about 50% in Figs. 1 and 2 of the drawing.

Many changes will be apparent to those skilled in the art but it is intended that such modifications, particularly those involving the purification with alkali and precipitation with acid, as will follow from the description given above, be part of my invention and discovery and that the invention not be limited except with respect to the appended claims.

I claim:

1. A process for manufacturing infra-red transparent optical elements from fused pentavalent arsenic glass selected from the group consisting of $As_2Se_5$, $As_2Se_3S_2$ and $As_2Se_2S_3$ comprising comminuting said glass into finely divided form, dissolving said finely divided glass in an aqueous alkaline solution containing alkali selected from the group consisting of ammonium hydroxide and alkali metal hydroxide acidifying the aqueous alkaline solution with mineral acid to form a precipitate, isolating and purifying said precipitate by washing with water to remove the acid and other water-soluble impurities from said precipitate, fusing said precipitate in an inert atmosphere at a temperature of about 500° C. to form a molten arsenic pentaselenide glass, casting and cooling said glass and forming an optical element therefrom which exhibits enhanced transmission in the infra-red region as compared with transmission of optical elements prepared from the starting fused pentavalent arsenic glass.

2. A process for manufacturing fused pentavalent arsenic glass selected from the group consisting of $As_2Se_5$, $As_2Se_3S_2$ and $As_2Se_2S_3$ adapted for forming infra-red transparent optical elements having enhanced transmission comprising comminuting said glass into finely divided form, dissolving said finely divided glass in an aqueous alkaline solution containing alkali selected from the group consisting of ammonium hydroxide and alkali metal hydroxide, acidifying the aqueous alkaline solution with mineral acid to form a precipitate, isolating and purifying said precipitate by washing with water to remove the acid and other water-soluble impurities from said precipitate, fusing said precipitate in an inert atmosphere at a temperature of about 500° C. to form a molten arsenic pentaselenide glass, and casting and cooling said glass.

3. A process for manufacturing infra-red transparent optical elements as claimed in claim 1 wherein the starting fused pentavalent glass is $As_2Se_5$.

4. A process for manufacturing infra-red transparent optical elements as claimed in claim 1 wherein the starting fused pentavalent glass is $As_2Se_3S_2$.

5. A process for manufacturing infra-red transparent optical elements as claimed in claim 1 wherein the starting fused pentavalent glass is $As_2Se_2S_3$.

(References on following page)

References Cited in the file of this patent

UNITED STATES PATENTS

| | | | |
|---|---|---|---|
| 2,398,530 | Hooley | Apr. 16, | 1946 |
| 2,434,281 | Moulton | Jan. 13, | 1948 |
| 2,512,257 | Pfund | June 20, | 1950 |
| 2,659,271 | Treuting | Nov. 17, | 1953 |

OTHER REFERENCES

Mellor: "Comprehensive Treatise on Inorganic and Theoretical Chemistry." Publ. 1930, vol. 10, page 702.

"A New Triaxial System of Infrared Glasses," article by Fraser in "The Journal of the Optical Society of America," vol. 43, No. 9, p. 823, September 1953.

Hoffmann: Lexickon der Anorgan Verbindungen, Band 1, 2. Halfte Overcksilber bis. bar. No. 32–55, p. 1192 (1919).